United States Patent Office 3,097,301
Patented July 9, 1963

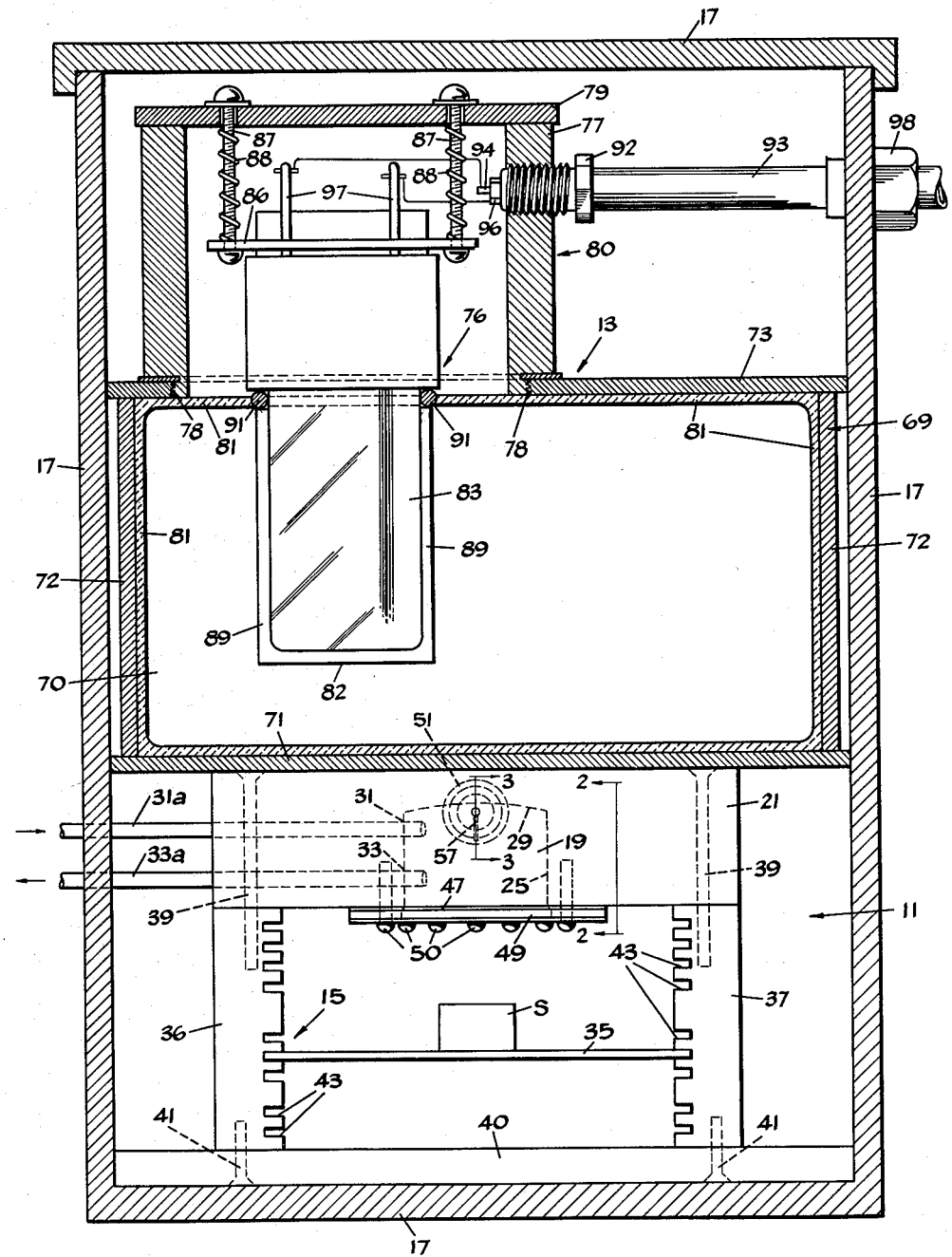

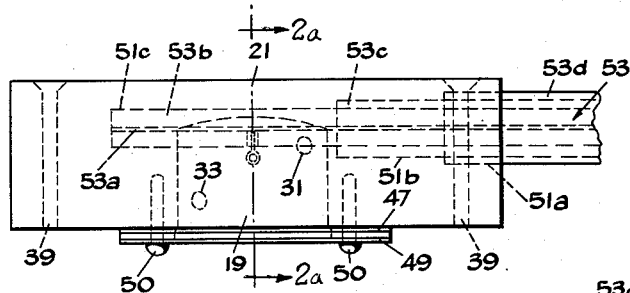
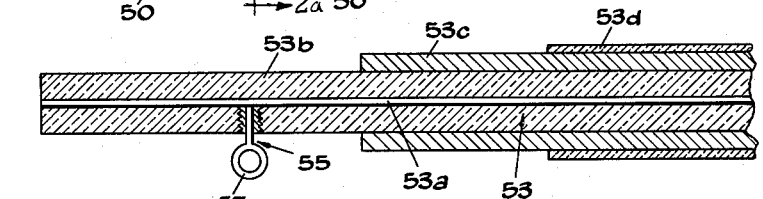
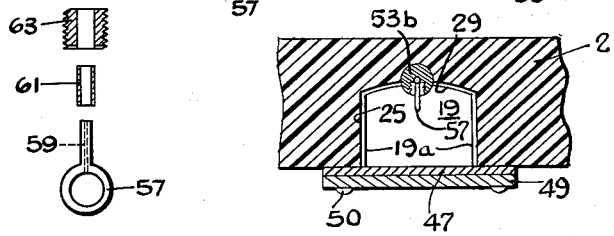
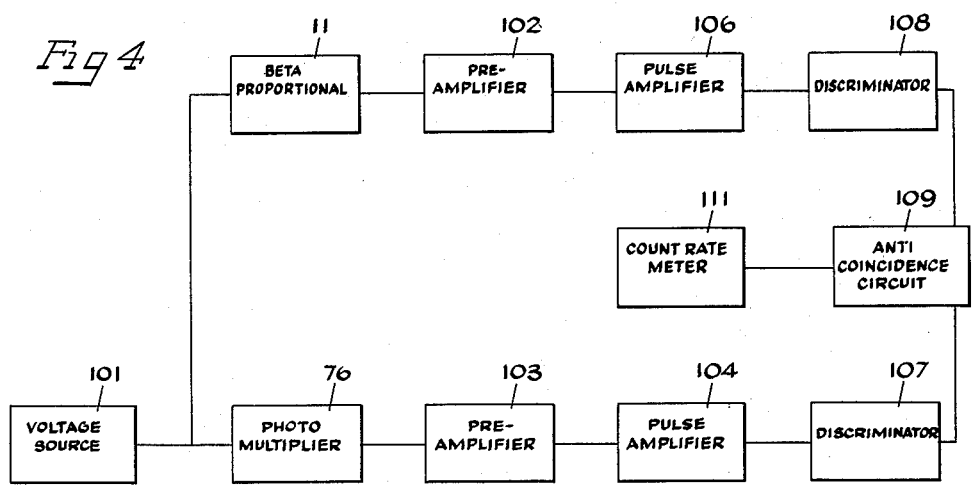

3,097,301
RADIATION DETECTING APPARATUS OF THE IONIZATION CHAMBER AND SCINTILLATION TYPE
Rodman A. Sharp, La Jolla, and Myron S. Eichen, Solana Beach, Calif., assignors to General Dynamics Corporation, New York, N.Y., a corporation of Delaware
Filed Sept. 12, 1960, Ser. No. 55,584
7 Claims. (Cl. 250—83.6)

The present invention relates to apparatus for detecting and measuring radiation, and more particularly to counting apparatus for measuring beta particle radiation.

Numerous counters and other similar apparatus have been developed for measuring various types of radiation including radiation from beta samples. However, with the exception of devices based on gas proportional umbrellas, these devices generally are not sufficiently versatile to measure radiation from both weak and intense beta samples. This is true because the time resolution of such devices when designed to measure radiation from weak beta samples is usually not short enough to adequately respond to radiation emanating from more intense samples that may be encountered in radio-chemical work. Additionally, counters and detectors which are utilized to measure radiation from weak beta samples often produce background counts which result from cosmic radiation. The presence of such background counts due to cosmic radiation make it extremely difficult to separate the slow count which is a measure of the radiation of a weak beta sample. Manifestly, a device which is capable of measuring radiation from both weak and intense beta samples should be adapted to suppress background counts produced by cosmic and other radiation.

Accordingly, it is the principal object of the present invention to provide an improved detecting and measuring apparatus for radiation emanating from both weak and intense beta samples based on a scintillation counter umbrella.

An additional object of the invention is to provide a beta particle counting system which will detect slow counts and which has a sufficiently short time resolution to detect more rapid counts that may be encountered.

A more specific object of the invention is the provision of a gas flow proportional counting apparatus which is adapted to suppress background counts produced by cosmic radiation and which is sufficiently versatile to measure radiation flux density from both weak and intense beta samples.

Still another object of the invention is the provision of a simple yet versatile counting apparatus which may be constructed at a relatively low expense from readily available materials.

Other objects and advantages of the present invention will become apparent by reference to the following description and to the accompanying drawings of one preferred embodiment of the invention.

In the drawings:

FIGURE 1 is an elevational view partially in section depicting a gas-flow proportional counter embodying various of the features of the invention;

FIGURE 2 is a sectional view taken along line 2—2 of FIGURE 1;

FIGURE 2a is a fragmentary cross sectional view of a portion of the gas flow proportional counter taken along the line 2a in FIGURE 2;

FIGURE 3 is a fragmentary sectional view taken along line 3—3 of FIGURE 1;

FIGURE 3a is an exploded view, partially in section showing the construction of an anode of the type utilized in the gas-flow proportional counter illustrated in FIGURE 1; and FIGURE 4 is a diagrammatic illustration of a preferred counting network employed with the detecting apparatus shown in the preceding drawings.

In general, the present invention is directed to the combination of a conventional gas-flow beta proportional counter with a plastic phosphor anti-coincidence umbrella. In contradistinction to the well known practice of combining a principal detector with an ancillary detector which encompasses the principal detector in umbrella fashion and which has radiation responsive characteristics analogous thereto, the subject combination provides a system possessing a background responsive to beta radiation from very weak samples and with a time resolution short enough to respond to radiation from very intense samples. More specifically, the combined unit provides a device responsive to a wide range of beta radiation counts from approximately one count per minute to approximately $2 \times 10^6$ counts per minute.

The detecting and measuring apparatus illustrated in FIGURE 1 includes, among other things, a gas-flow beta proportional counter unit 11, above which is positioned a cosmic radiation detecting or umbrella unit 13 that functions as a scintillation counter. Beneath the proportional counter unit 11, support means 15 are provided for the samples to be measured. As illustrated, the entire unit is preferably surrounded by a lead sheath housing 17 which is provided with a suitable access opening (not shown) through which samples may be placed on the sample support means 15.

The gas-flow beta proportional counter unit 11 is fabricated in an extremely simple manner. It includes an ionization chamber 19 which is formed in the central portion of a generally rectangular body section 21. The body section 21 is preferably formed from a block of epoxy resin. The chamber 19, as illustrated in FIGURE 2a, is generally cylindrical in shape having vertical side side walls 25 and a slightly arched upper wall 29. The lower extremity of the chamber 19 is flush with the lower surface of the body section 21.

Gas is conducted into and out of the chamber through entrance and exit passageways 31 and 33 that are formed in the block 21. The passageways 31 and 33 are connected through conduits 31a and 33a, which extend through the lead sheath housing 17, to a source of methane or other suitable gas (not shown).

The body section 21 of the counter unit 11 is supported on a pair of vertically arranged side plates 36 and 37 which are aligned in generally parallel planes. The body section 21 is attached to the side plates by any suitable means such as cap screws 39. The lower surfaces of the side plates 36 and 37 are attached to a base plate 40 by means of cap screws 41. The base plate 40 in turn is supported in the bottom surface of the lead sheath 17 as illustrated.

As depicted in FIGURE 1, a sample S, which emits beta radiation, is positioned on a plate 35 beneath the counting chamber 19. The plate 35 is positioned within a pair of horizontally aligned spaced channels 43 which are provided in the plates 36 and 37. Numerous of the channels 43 are provided so that the sample shelf 35 may be moved to a number of vertically spaced positions beneath the body section 21 to accommodate various sized samples S. A thin film 47 of a material such as Mylar spans the lowermost opening in the counter chamber 19 and is held in place by means of a locking ring 49 which is secured to the lower surface of the body section 21 by a series of circumferentially spaced cap screws 50.

Referring now to FIGURE 2, a horizontally disposed aperture is formed in the body section 21 and is adapted to receive a coaxial cable 53. The cable 53 comprises a central conductor 53a which is surrounded by a layer of insulation 53b. The insulation 53b is enveloped in a sheath of metallic braiding 53c which in turn is covered by an outer layer of insulation 53d. The outermost portion 51a of the passageway 51 is proportioned to receive the outer diameter of the coaxial cable 53 including the outer layer of insulation 53d. The portion 51b of the passageway 51 between the end of the portion 51a and one side wall 25 of the chamber 19 is of reduced diameter and is proportioned to closely surround the braided metal sheath 53c of the coaxial cable 53. The remaining portion 51c, which extends across and through the upper portion of the chamber 19 to the opposite side of the body section 21, is adapted to receive the inner plastic insulating layer 53b of the coaxial cable as illustrated.

As illustrated in FIGURES 3 and 3a, an anode 55 is provided for the counter 11 which consists of a circular loop of wire 57, a short length of tubing 61, and an apertured screw member 63. The loop of wire 57 is preferably fabricated from a stainless steel wire having a diameter of approximately 1 mil and formed so that the loop has a diameter of approximately ⅛ inch. The extremities 59 of the wire 57 forming the loop are arranged in parallel relationship and are tightly positioned within a length of tubing 61.

Ionizing potential is applied to the conductor 53a of the cable 53, and this voltage is supplied to the screw 63 wherein the length of tubing 61 is positioned. The screw 63 is positioned within the plastic sheath of the cable so that the extremity opposite the loop of wire 57 firmly engages the central conductor 53a. Accordingly, ionizing potential applied to the central conductor 53a is maintained on the loop anode 55 which is positioned within the gas-filled chamber 19.

The interior walls 25 and 29 of the chamber 19 serve as the cathode for the proportional counter unit 11. Accordingly, these walls are plated with a layer 19a of a material such as gold and the Mylar film 47 which spans the lower opening of the chamber is plated on both sides in a similar manner. The layer 19a is in electrical contact with the braided metal sheath 53c of the coaxial cable 53.

The proportional counter unit 11 which includes the ionization chamber 19 not only detects and responds to beta radiation emanating from the sample S but will also detect cosmic and other background radiation. Therefore the signal produced by the chamber due to ionization of the gas therein will contain counts produced by beta radiation as well as background radiation.

The cosmic radiation detecting or scintillation counter unit 13 is adapted to fit within the lead sheath 17 and is supported on the upper surface of the body section 21 of the proportional counter unit 11. This umbrella unit 13 comprises an outer casing 69 which encompasses a luminophor or light-energy pulse generating means 70. The luminophor utilized in a preferred embodiment of the invention is a plastic phosphor wherein scintillations are produced by the incidence of radiation thereon, which radiation penetrates the umbrella unit 13 as well as the counter unit 11.

The casing 69 for the umbrella unit 13 is a cylindrical can which includes a bottom plate 71, cylindrical side walls 72 and a plain upper plate or top closure 73. The casing is fabricated from suitable materials such as hardened copper sheets, and is proportioned to fit snugly within the lead sheath 17. The casing 71 ensures the beta radiation emitted by the sample does not reach the luminophor 70.

The upper portion of the casing is adapted to receive a photo-multiplier detecting tube 76 and a casing 80 therefor, which extends upwardly from the top closure 73 of the umbrella unit 13, is also cylindrical in shape. The cylindrical casing 80 comprises a tubular section 77 whose lower end is threaded to fit within mating threads 78 in an opening provided in the plate 73 of the casing 69 eccentric of the center of the casing. A top closure is provided for the cylindrical container which, in the illustrated embodiment, is the plate 79.

As illustrated in the drawings, the luminophor 70 is fabricated from an ingot of plastic phosphor which is cylindrical in shape. The cylindrical ingot is positioned and cemented within the lower portion of the casing 69 with a suitable epoxy resin cement 81. A well 82 is provided in the plastic phosphor for receiving a bulb 83 of the photo-multiplier tube 76. The diameter of the well 82 is slightly greater than that of the bulb, and the depth thereof is sufficient to permit insertion of the bulb in the well with reasonable clearance. As shown in the drawings, the base of the tube is positioned within the casing 80 and is biased toward the well 82 by conventional spring biasing means. The biasing means includes a non-conductive plate 86 which is free to move in a vertical direction on a series of circumferentially spaced rods 87. As illustrated, springs 88 are provided intermediate the plate 86 and the cover 79 to resiliently bias the tube toward the well provided in the luminophor 70.

In order to enhance the operation of the photo-multiplier, the space in the well intermediate the walls of the luminophor 70 and the bulb of the tube 76 is filled with a transparent liquid 89 which serves to minimize the amount of reflection of the light-energy pulses produced by scintillation within the luminophor. Enough of the fluid is placed in the well so that when the bulb 83 of the tube is placed in the well 82 the entire volume between the bulb and the walls of the luminophor is filled with the fluid. A preferred liquid is a liquid silicone having a viscosity of approximately 100,000 stokes.

The fluid is maintained in the desired area by means of an O-ring 91 which bears against the base of the tube, the walls of the glass tube bulb and the upper margins of the well in the plastic phosphor. Suitable pressure is applied to the O-ring joint through the spring and plate connection which has been previously described.

Electrical connections to the photo-multiplier tube 76 are provided through a fitting 92 which carries a coaxial cable 93 into the container. The cable 93 is similar to the cable 53 and includes a central conductor or lead 94 which is suitably insulated from a braided metallic conductor 96. The central lead 94 of the coaxial cable is attached to the anode of the photo-multiplier tube 76, and the braided metallic conductor 96 is connected to the cathode of the tube. While only two base prongs 97 of the tube are illustrated, other prongs are provided by the tube and are interconnected by suitable resistor strings in accordance with normal procedures which are well known to those skilled in the art. From the outer surface of the casing 80, the coaxial cable is carried through a suitable fitting 98 in the walls of the lead sheath 77 and thence to an electronic counting network.

Referring now to FIGURES 1 and 4, the operation of and functions performed by the composite proportional counter unit 11 and anti-coincidence umbrella unit 13 will be described.

The anode 55, as previously described, has ionizing potential supplied thereto from a source 101 (FIGURE 4). Therefore, the beta radiation emanating from a sample S and passing into the chamber 19 causes ionization of the gas therein, and accordingly, a signal is produced which is proportional to the amount of ion current flowing between the anode and cathode of the counter. In addition to the signal resulting from ionization effected by beta radiation entering the chamber 19, additional ionization within the chamber results from cosmic and other background radiation and a signal proportional thereto is produced. Therefore, the output from the beta proportional counter unit will contain a signal proportional to the total beta radiation emanating from the sample S and from cosmic and background radiation components. This composite signal produced by ionization of the gas within the chamber 19 is fed to a pre-amplifier 102.

The cosmic and other background radiation which effects ionization of the gas within the chamber 10 also penetrates the luminophor 70 encased within the casing 69 of the umbrella unit 13. The cosmic and other background radiation penetrating the plastic phosphor induces scintillation therein and, accordingly, the emission of electric wave energy covering the visible spectral region. The light-energy pulses produced by scintillation within the luminophor are recorded by the photo-multiplier tube 76 that is also supplied with energizing potential from the voltage source 101.

The signal produced by the photo-multiplier 76 is fed to a pre-amplifier 103 and thereafter to a pulse amplifier 104. Similarly, the output of the pre-amplifier 102 associated with the beta proportional counter unit 11 is fed to a pulse amplifier 106. The output of each of the pulse amplifiers 104 and 106 contains a series of pulses proportional to the cosmic radiation penetrating the luminophor 70 of the anticoincidence umbrella 13 and the chamber 19 of the beta proportional counter unit 11. Additionally, the output of the pulse amplifier 106 contains a series of pulses which are proportional to the beta radiation count.

The output of each of the pulse amplifiers 104 and 106 is fed to discriminating circuits 107 and 108 which are designed to block any low energy pulses that might be present due to the penetration of the energy-responsive media by gamma radiation or the like. The output from each of the discriminators 107 and 108 is fed into an anti-coincidence circuit 109.

The anti-coincidence circuit 109 serves as a gating network which passes pulses proportional to the beta radiation count to a count rate meter 111 and provides an accurate measure of the beta radiation flux density. Moreover due to the time resolution of the composite detecting apparatus, radiation emanating from both weak and intense beta samples can be accurately measured and recorded. During those intervals when undesirable counts due to cosmic radiation effects are fed to the anti-coincidence circuit from the discriminators 107 and 108 along with counts produced by beta radiation, the output from the anti-coincidence circuit will be blocked and the count rate meter will not be rendered effective.

It should be understood that the above described embodiment is simply illustrative of the application of the invention. Numerous other arrangements of the structural features described may be readily devised by those skilled in the art which would embody the principles of the invention and fall within the spirit and scope thereof.

What is claimed is:

1. In apparatus for detecting beta radiation emanating from a source thereof in the presence of background radiation including cosmic radiation, a counter unit, means for supporting said counter unit adjacent the source of beta radiation, said counter unit including a gas filled ionization chamber having an electrically conductive coating on the inner surface thereof which provides the cathode of said chamber and a loop anode positioned in said chamber, means for establishing an ionizing potential between said loop anode and said conductive coating so that beta and back-ground radiation penetrating said chamber effect ionization of the gas therein and the generation of signals proportional thereto, said last mentioned means including a coaxial cable extending into said chamber, said cable having first and second conductive elements and insulation surrounding said elements, said first conductive element of said cable being electrically connected to said conductive coating, said anode including a portion mounted within said cable insulation in electrical contact with said second conductive element, a scintillation detecting unit mounted on said counter unit, said detecting unit including both a radiation responsive medium wherein light-energy pulses are produced by penetrating background radiation and means responsive to said light-energy pulses for generating an electrical signal proportional thereto, and means responsive to signals generated by said scintillation detecting unit and said gas filled ionization chamber for generating an output signal proportional to the beta radiation emanating from said source and for eliminating signals resulting from background radiation.

2. In apparatus for detecting beta radiation emanating from a source thereof in the presence of background radiation including cosmic radiation, a counter unit, means for supporting said counter unit adjacent the source of beta radiation, said counter unit including a gas filled ionization chamber having an electrically conductive coating on the inner surface thereof which provides the cathode of said chamber and a loop anode positioned in said chamber, means for establishing an ionizing potential between said loop anode and said conductive coating so that beta and background radiation penetrating said chamber effect ionization of the gas therein and the generation of signals proportional thereto, said last mentioned means including a coaxial cable extending into said chamber, said cable including an inner conductor and a conductive sheath of metallic braiding suitably insulated from each other, said metallic braiding being electrically connected to said conductive coating, said cable being provided with a recess extending through the insulation of said cable to said inner conductor, an apertured screw member threaded within said recess and electrically connected to said inner conductor, said anode including a first portion mounted within said aperture in electrical contact with said inner conductor, a scintillation detecting unit mounted over said counter unit and including a luminophor body of plastic phosphor wherein light-energy pulses are produced by penetrating radiation, said body having a well formed therein, a light sensitive device which is operable to transform light-energy into an electrical signal, means for supporting said light sensitive device within said well in spaced relation to said luminophor body, and means responsive to signals generated by said scintillation detecting unit and said gas filled ionization chamber for generating an output signal proportional to the beta radiation emanating from said source and for eliminating signals resulting from background radiation.

3. Radiation detecting apparatus which comprises electrically non-conductive means defining a chamber having electrically conductive coating on the inner surface thereof to provide a cathode; means for supplying an ionizable gas to said chamber; a coaxial cable extending through said chamber defining means and into said chamber; said cable including an inner conductor, a conductive sheath of metallic braiding, and a solid layer of insulation for electrically insulating said inner conductor from said conductive sheath, said conductive sheath being electrically connected to said conductive coating, said cable being provided with a recess extending through the insulation of said cable to said inner conductor; an apertured conductive screw member threaded within said recess and electrically connected to said inner conductor, an anode member mounted within said chamber, said anode including a first portion mounted within the aperture provided in said screw member and in electrical contact with said inner conductor; a second portion of said anode being formed in loop configuration and positioned within said chamber in spaced relation to the conductive coating; and means connected to said inner conductor and said braiding for providing ionizing potential between said cathode and said anode whereby radiation penetrating said chamber effects ionization of the gas therein and the generation of signals proportional to the radiation intensity.

4. A scintillation detecting unit which comprises a radiation responsive medium wherein light-energy pulses are generated by penetrating radiation, said radiation-responsive medium having a well formed therein; a photomultiplier tube having a base and bulb, said bulb being proportioned with a diameter smaller than the diameter of the well; a transparent fluid provided in the well; resilient means for biasing said tube toward said well so that said fluid encompasses said bulb and minimizing the reflection of light energy pulses generated in said radiation-responsive medium; and a resilient retaining ring positioned about said tube in engagement with the juncture of said base and said bulb, the relative proportion of said base, bulb and retaining ring being such that said bulb and said transparent fluid are sealed within said well.

5. A scintillation detecting unit which comprises a radiation responsive medium wherein light-energy pulses are generated by penetrating radiation, said radiation-responsive medium having a well formed therein; a photomultiplier tube having a base and a bulb, said bulb having a diameter smaller than the diameter of the well; a transparent silicone fluid provided in the well; spring means for biasing said tube toward said well so that said fluid within the well encompasses said bulb and minimizes the reflection of light energy pulses generated within said radiation-responsive medium; and a resilient O-ring positioned about said light sensitive device in engagement with the juncture of said base and said bulb, the relative proportions of said base, bulb and O-ring being such that said bulb and said silicone fluid are sealed within said well.

6. Apparatus for detecting beta radiation emanating from a source thereof in the presence of background radiation including cosmic radiation, which apparatus comprises a gas flow proportional counter unit, means supporting said counter unit adjacent the source of beta radiation, said counter unit including means for producing electrical signals proportional to the amount of penetrating beta radiation and to the amount of background radiation, a scintillation detecting unit mounted on said counter unit, said scintillation detecting unit being shielded from the beta radiation emanating from said source and for producing electrical signals proportional to the amount of penetrating background radiation, and means coupled to said gas flow proportional counter and to said scintillation detecting unit for generating an output signal related to the signal proportional to the amount of beta radiation emanating from said source and for eliminating signals resulting from background radiation.

7. Low background counting apparatus having a short time resolution for detecting beta radiation emanating from both weak and intense beta samples in the presence of background radiation including cosmic radiation, which apparatus comprises a gas flow proportional counter unit, means supporting said counter unit adjacent the beta sample to be detected, said gas flow proportional counter unit including means for producing electrical signals proportional to the amount of penetrating beta radiation and to the amount of background radiation, a scintillation detecting unit mounted in overlying relation on said gas flow proportional counter unit, said detecting unit including both a radiation responsive medium wherein light energy pulses are produced by penetrating background radiation and means responsive to said light energy pulses for generating electrical signals proportional thereto, and means coupled to said gas flow proportional counter and to said scintillation detecting unit for generating an output related to the signal proportional to the amount of beta radiation emanating from the sample being detected and for eliminating signals produced by penetrating background radiation.

References Cited in the file of this patent

UNITED STATES PATENTS

| | | |
|---|---|---|
| 2,535,066 | Herzog | Dec. 26, 1950 |
| 2,750,514 | Armistead | June 12, 1956 |
| 2,828,423 | Scherbatskoy | Mar. 25, 1958 |
| 2,917,634 | Barnothy | Dec. 15, 1959 |
| 2,928,947 | Cherry | Mar. 15, 1960 |
| 2,946,891 | Wesolowski | July 26, 1960 |

OTHER REFERENCES

Some Techniques for Measurement of Fast Neutron Flux, by Diven, B. C., from Peaceful Uses of Atomic Energy, published by United Nations, New York, N.Y., 1956, vol. 4, pp. 251 to 257.